(12) United States Patent
Bae et al.

(10) Patent No.: US 7,729,587 B2
(45) Date of Patent: Jun. 1, 2010

(54) METHOD OF PRODUCING PLANAR MULTIMODE OPTICAL WAVEGUIDE USING DIRECT PHOTOPATTERNING

(75) Inventors: Byeong-Soo Bae, Daejeon (KR); Dong-Jun Kang, Daejeon (KR); Jin-Ki Kim, Daejeon (KR); Woo-Soo Kim, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 310 days.

(21) Appl. No.: 11/794,567

(22) PCT Filed: Dec. 28, 2005

(86) PCT No.: PCT/KR2005/004620

§ 371 (c)(1),
(2), (4) Date: Jul. 2, 2007

(87) PCT Pub. No.: WO2006/075849

PCT Pub. Date: Jul. 20, 2006

(65) Prior Publication Data

US 2009/0142025 A1 Jun. 4, 2009

(30) Foreign Application Priority Data

Jan. 17, 2005 (KR) ...................... 10-2005-0004320

(51) Int. Cl.
*G02B 6/00* (2006.01)
(52) U.S. Cl. ...................... 385/141; 385/142; 385/143; 385/144; 385/145; 385/122; 385/123; 385/124; 385/125; 385/126; 385/127; 385/128; 385/129; 385/130; 385/131; 385/132
(58) Field of Classification Search ......... 385/141–145, 385/122–132
See application file for complete search history.

(56) References Cited

U.S. PATENT DOCUMENTS 3,809,732 A 5/1974 Chandross et al.

(Continued)

FOREIGN PATENT DOCUMENTS

| KR | 10-0426959 | 10/2003 |
|----|------------|---------|
| KR | 10-0426959 | 4/2004 |

OTHER PUBLICATIONS

Bae et al., "Direct Laser Writing of Self-Developed Waveguides in Benzyldimethylketal-doped Sol-gel Hybrid Glass." *J. Mater. Res.*, v.16:11, pp. 3184-3187, 2001.

(Continued)

*Primary Examiner*—Charlie Peng
*Assistant Examiner*—Guy G Anderson
(74) *Attorney, Agent, or Firm*—The Nath Law Group; Susanne M. Hopkins; Derek Richmond

(57) ABSTRACT

Disclosed is a method of producing a planar multimode optical waveguide by direct photo-patterning and, more particularly, to an optical waveguide material and a method of producing the same. It is possible to control the refractive index of the optical waveguide, and the optical waveguide has a desirable refractive index distribution throughout different dielectric regions. In the method, it is unnecessary to conduct processes of forming a clad layer and of etching a core layer, thus a production process is simplified. The method comprises coating a photosensitive hybrid material having a refractive index or a volume changed by light radiation, in a thickness of 10 microns or more, and radiating light having a predetermined wavelength onto the coated photosensitive hybrid material to form the multimode optical waveguide due to a change in refractive index of a portion onto which light is radiated.

11 Claims, 2 Drawing Sheets

U.S. PATENT DOCUMENTS

| | | |
|---|---|---|
| 3,953,602 A | 4/1976 | Shemano |
| 5,774,603 A | 6/1998 | Moore et al. |
| 6,054,253 A | 4/2000 | Fardad et al. |
| 6,309,803 B1 | 10/2001 | Coudray et al. |
| 6,818,721 B2 * | 11/2004 | Zha et al. ............. 528/12 |
| 6,931,167 B2 * | 8/2005 | Ohtsu et al. ........... 385/14 |
| 7,164,814 B2 * | 1/2007 | Ohtsu et al. ........... 385/14 |
| 7,218,812 B2 * | 5/2007 | Maxwell et al. ........ 385/33 |
| 7,232,650 B2 * | 6/2007 | Leatherdale et al. .... 430/321 |

OTHER PUBLICATIONS

Bae, Byeong-Soo et al., "Direct laser writing of self-developed waveguides in benzyldimethylketal-doped sol-gel hybrid glass", Journal of Materials Research, 2001, pp. 3184-3187, vol. 16, No. 11, Materials Research Society.

* cited by examiner

[Fig. 1]
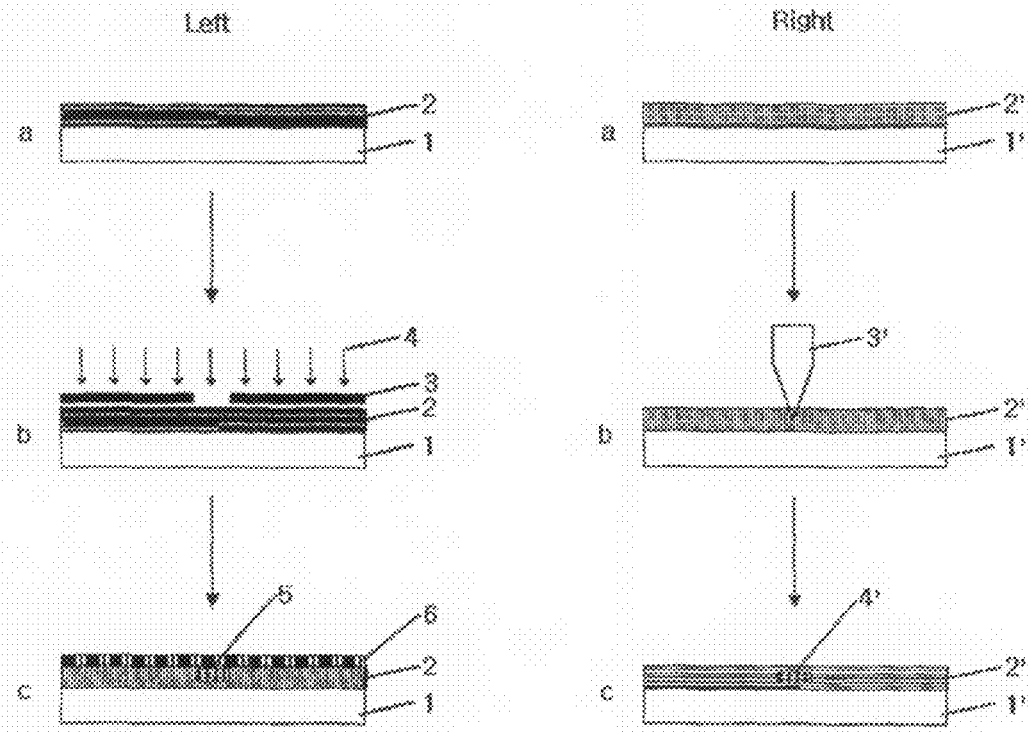
[Fig. 2]
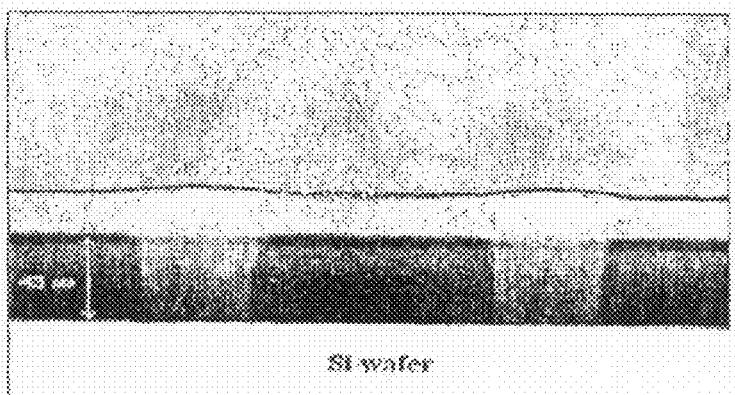
[Fig. 3]
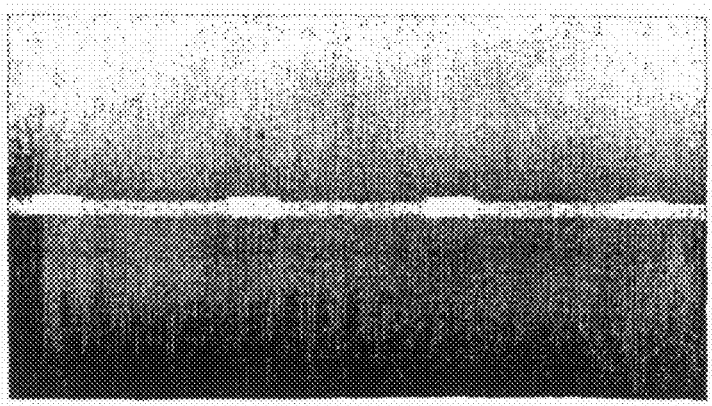

[Fig. 4]
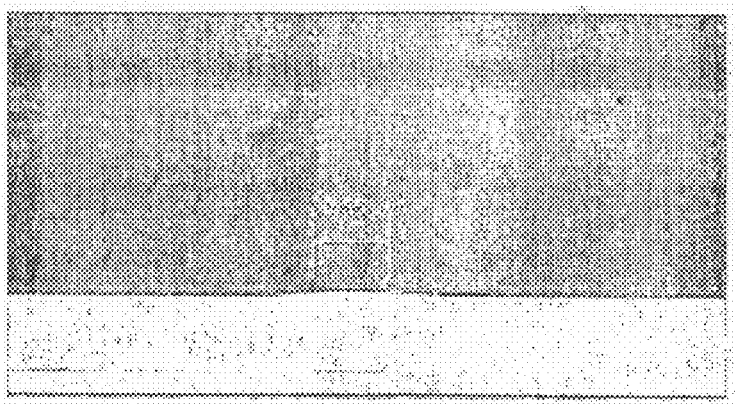
[Fig. 5]
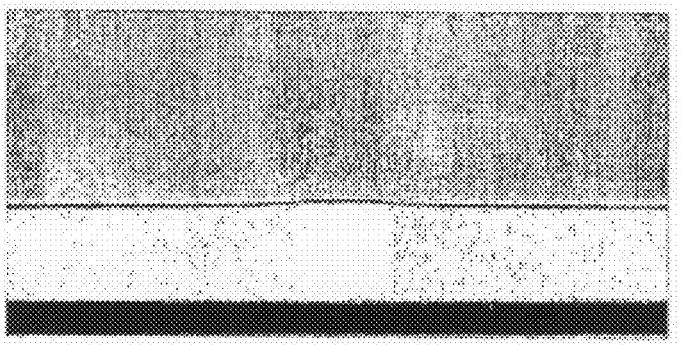
[Fig. 6]
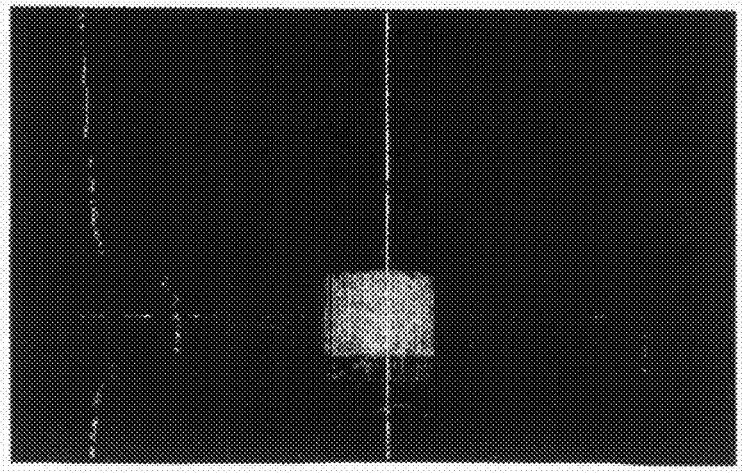

METHOD OF PRODUCING PLANAR MULTIMODE OPTICAL WAVEGUIDE USING DIRECT PHOTOPATTERNING

TECHNICAL FIELD

The present invention relates, in general, to a method of producing a multimode optical waveguide and, more particularly, to an optical waveguide material and a method of producing the same. It is possible to control the refractive index of the optical waveguide, and the optical waveguide has a desirable refractive index distribution throughout different dielectric regions. In the method, it is unnecessary to conduct processes of forming a clad layer and of etching a core layer, thus a production process is simplified.

BACKGROUND ART

Currently, rapidly increasing demand for communication causes a rapid increase in the use of an optical waveguide device for optical communication, optical signal processing, and optical connection. Particularly, the ability to easily arrange optical fibers is needed in order to rapidly transfer an optical signal. To satisfy the above need, the production of a multimode optical waveguide device having a large core layer is considered very important, and, recently, has been frequently studied.

Typically, the optical waveguide device is produced using a semiconductor production technology or a MEMS (micro electro mechanical system) technology, and a planar optical waveguide technology is employed in the course of producing the optical waveguide device on a planar substrate. Additionally, studies have been continuously made to further integrate functions of the optical waveguide device.

A conventional method of producing the optical waveguide device is as follows. After a lower clad layer is formed on a substrate, a core layer is layered on an upper side of the lower clad layer. Subsequently, a photoresist layer is formed on an upper side of the core layer, exposed and developed to form a photoresist pattern. The core layer is etched using the photoresist pattern, thus the core layer is patterned. Next, an upper clad layer is formed on an upper side of the patterned core layer, thereby creating the optical waveguide.

The clad layer or the core layer is typically formed through a spin coating process and a deposition process, and is made of silicas having different refractive indices or polymers having different refractive indices. However, if silica is used as a material for the core and clad layers, the difference between the refractive indices of the core and clad layers is a maximum of 0.75%. Accordingly, use of the above materials is problematic in that it is difficult to produce a device for multimode optical communication because the size of the optical waveguide is limited.

The above method is problematic in that it increases the cost of the optical waveguide device and reduces reliability. Hence, many processes have been suggested to simplify stages constituting the method of producing the optical waveguide. Of them, the simplest process is a technology of forming an optical waveguide, in which a photosensitive material the refractive index and thickness of which have been permanently changed by light radiation is directly photo-patterned on a coat.

U.S. Pat. Nos. 3,809,732 and 3,953,602 disclose a method of producing an optical waveguide, in which a refractive index and a thickness of a polymer material are changed through a photo-locking process. However, the use of only the polymer material leads to many problems in the course of producing a multimode optical waveguide having a large core layer because the material has a low thermal stability, and because light dispersion and loss are large. Furthermore, Korean Patent Registration No. 0426959 discloses a method of producing an optical waveguide through direct photopatterning using an inorganic/organic nano hybrid material, which is produced employing a sol-gel method, and a photosensitive hybrid material, which is doped with a photoinitiator for forming dimers to initiate polymerization. However, it is difficult to produce a thick layer, which is largely shrunken during hardening or photo-patterning, using the photosensitive polymer material and the inorganic/organic nano hybrid material. Thus, it is difficult to produce a multimode optical waveguide which includes a structure having a size of 10 microns or more.

Conventional inorganic/organic nano hybrid polymer is produced through a sol-gel method, in which organometallic alkoxide is hydrolyzed and condensed using water and a catalyst to produce a solution, and is then hardened. U.S. Pat. Nos. 6,054,253, 5,774,603, and 6,309,803 disclose a process of applying an inorganic/organic nano hybrid polymer, which is produced through the above sol-gel method, to an optical device. As well, the present inventors (Bae et al.) have suggested a method of producing an optical waveguide through direct photopatterning using an inorganic/organic nano hybrid polymer produced through a sol-gel method, as disclosed in Journal of Materials Research (JMR), 16[11], pp 3184-3187 (2001).

However, since the inorganic/organic nano hybrid polymer, which is produced through the above method, is insufficiently cured at low temperatures, silanol groups remain in the hybrid material. The remaining silanol groups absorb wavelengths of 1310 nm and 1550 nm, which correspond to near infrared rays currently used in optical communication, thus a transmission loss is undesirably large. Furthermore, if the inorganic/organic nano hybrid polymer is used for a long time, moisture in atmospheric air is adsorbed onto the silanol groups in the material, thus the performance of a device may be reduced. As well, the inorganic/organic nano hybrid polymer, which is produced through the above method, is disadvantageous in that it is difficult to produce the desirable multimode optical waveguide because of a difficulty in forming a film having a size of 10 microns or more, which is considered to be one of the most fatal problems.

DISCLOSURE OF INVENTION

Technical Problem

Accordingly, the present invention has been made keeping in mind the above problems occurring in the prior art, and an object of the present invention is to provide a method of producing a multimode optical waveguide including a structure having a size of 10 microns or more, which comprises few processes and is capable of reducing light loss. The method is based on the observation of main optical reaction characteristics with respect to photoresponsiveness using a photosensitive hybrid material.

The photosensitive hybrid material includes oligosiloxane, and a photoresponsive organic monomer, which is capable of forming polymer, or a photoinitiator, which forms dimers by radiation of light to initiate polymerization. Oligosiloxane has excellent optical properties and stability, is very useful to produce the multimode optical waveguide because it is capable of being applied in a thick layer, and has organic functional groups capable of being polymerized, unlike conventional inorganic/organic hybrid polymers.

Another object of the present invention is to provide a method of simply producing a multimode optical waveguide including a large core structure having a desirable refractive index distribution, in which a wet etching process is not conducted in a process of coating a clad layer and a patterning process employing a photolithography process using radiation of light.

Technical Solution

The present invention relates to a multimode optical waveguide material and a method of producing the same. The method comprises applying the optical waveguide, which includes a photosensitive inorganic-organic hybrid material, in a thickness of 10 microns or more, and patterning the applied optical waveguides, and radiating light on a predetermined portion of the applied optical waveguide to form the multimode optical waveguide due to the change in refractive index of the portion on which light is radiated. In the photosensitive inorganic-organic hybrid material, oligosiloxane, which has organic functional groups capable of being polymerized, is uniformly doped with a photoresponsive organic monomer capable of forming a polymer and a photoinitiator for initiating polymerization.

Oligosiloxane is based on a material disclosed in Korean Patent Application No. 2004-0025063 which has been filed by the inventor of the present invention.

In the present invention, oligosiloxane, which has the organic functional groups capable of being polymerized, may be expressed by Formula 1-1 or Formula 1-2.

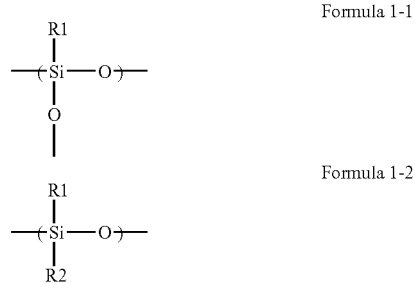

In Formula 1-1 or Formula 1-2, R1 and R2 are each a straight-chain, branched-chain, or ring type $C_{1-12}$ hydrocarbon compound having at least one of an acryl functional group, a methacryl functional group, an allyl functional group, a vinyl functional group, and an epoxy functional group.

Preferably, the photosensitive hybrid material for producing the multimode optical waveguide may comprise at least one of (a) an organic monomer, which is capable of forming a polymer in the photosensitive hybrid material when light is radiated on a predetermined portion of the optical waveguide, and (b) a photoinitiator, which forms dimers to initiate polymerization in the photosensitive hybrid material when light is radiated on the predetermined portion of the optical waveguide.

Molecular deformations of the oligosiloxane and the organic monomer constituting the photosensitive hybrid material, which are caused by the optical reaction when light is radiated on the predetermined portion of the optical waveguide, lead to molecular weight, shape, concentration, and chemical potential differences between the portions of the optical waveguide on which light is and is not radiated.

Accordingly, in the optical waveguide coated with the photosensitive hybrid material, oligosiloxane, which has organic functional groups capable of being polymerized, and the doped organic monomer migrate from the portion on which light is not radiated, to the portion on which light is radiated, and the volatility of the doped organic monomer is sufficiently reduced due to the desirable optical reaction at the portion on which light is radiated. Therefore, the refractive indices are caused to be different from each other between the portions of the optical waveguide on which light is and is not radiated, in the optical waveguide coated with the photosensitive hybrid material, thereby creating the multimode optical waveguide.

It is preferable that the refractive index of the photoresponsive organic monomer, which forms polymer or initiates polymerization by forming dimmers in the photo-sensitive hybrid material, be selected so as to be higher than that of oligosiloxane, which has the organic functional groups capable of being polymerized. Typically, the refractive index and thickness are increased according to an increase in concentration of the photoresponsive organic monomer. In this respect, the amount of dopant is typically 10 50 wt %.

The monomer capable of forming a polymer in the photo-sensitive hybrid material may be exemplified by an acrylate monomer including methacrylate. The dopant may be classified by the acrylate number of the acrylate monomer, that is, the number of functional groups. Examples of the monomer having one functional group include butyl acrylate, ethylhexyl acrylate, octyl/decyl acrylate, hybroxyalkyl acrylate, and cyclohexyl acrylate. Examples of the monomer having two functional groups include butanediol diacrylate, butylene glycol dimethacrylate, hexanediol diacrylate, hexanediol dimethacrylate, and tripropylene glycol diacrylate. Examples of a monomer having three functional groups include trimethylopropane triacrylate, trimethylopropane trimethacrylate, pentaerythritol triacrylate, and glyceryl propoxylated triacrylate. Examples of a monomer having four or more functional groups include pentaerythritol tetraacrylate, dipentaerythritol pentaacrylate, and ditrimethylopropane tetraacrylate. Beside acrylat monomers, examples of the monomer capable of forming a polymer in the photosensitive hybrid material include photoresponsive cinnamic acid- and ester-based monomers, such as methyl cinnamate, ethyl cinnamate, vinyl cinnamate, aryl cinnamate, cinnamyl cinnamate, glycol cinnamate, and benzyl cinnamate, a dicarboxylic acid cinnamyl monomer, and a methacrylic acid cinnamyl monomer. The monomer capable of forming a polymer in the photosensitive hybrid material is at least one selected from the above photoresponsive monomers.

The photochemical monomer, which forms dimers to initiate polymerization in the photosensitive hybrid material, is at least one monomer selected from the group consisting of a benzoin ether monomer, a benzylketal monomer, a dialkoxy acetophenone monomer, a hydroxy alkylphenone monomer, and an aminoalkylphenone monomer.

The above examples are illustrative, but do not limit the present invention.

BRIEF DESCRIPTION OF THE DRAWINGS

FIGS. 1a to 1c illustrate the production of a multimode optical waveguide according to the present invention;

FIG. 2 is a light microscope picture of a section of the multimode optical waveguide produced according to the present invention;

FIG. 3 is a near field picture of a 1×4 splitter produced according to the present invention;

FIG. 4 is a light microscope picture of a section of a multimode optical waveguide, which is produced by direct radiation of a laser without using a mask, according to the present invention;

FIG. 5 illustrates an output pattern of light of a white light of the multimode optical waveguide, which is produced by direct radiation of a laser without using the mask, according to the present invention; and FIG. 6 is a near field image of the multimode optical waveguide, which is produced by direct radiation of a laser without using the mask, according to the present invention.

BEST MODE FOR CARRYING OUT THE INVENTION

Hereinafter, a description will be given of the present invention, with reference to the accompanying drawings.

FIGS. 1a to 1c illustrate the production of a multimode optical waveguide according to the present invention.

A left column in FIGS. 1a to 1c illustrates the production of the multimode optical waveguide, which includes a core layer having a size of 10 micron or more, using a transparent and photosensitive hybrid material in which photoresponsive monomers are doped with oligosiloxane having organic functional groups capable of being polymerized.

An optical waveguide 2 is applied on a substrate 1 using the transparent and photosensitive hybrid material in which the photoresponsive monomers are doped with oligosiloxane having organic functional groups capable of being polymerized. In this respect, the substrate 1 and the optical waveguide 2 may be formed according to typical methods. For example, a spin coating method, which is capable of forming a layer having a uniform thickness, may be employed. Before the application is conducted using a solution, it is necessary to carefully wash a surface to which the solution is to be applied. The washing is a process useful to remove dust or impurities, which may affect layer quality.

Next, a mask 3 having a desired pattern is mounted on the optical waveguide 2 and light 4 having a specific wavelength is radiated thereon, thereby achieving a pattern. The patterning may be conducted using a laser instead of using the mask.

When light is radiated, light corresponding to a wavelength, to which a photoinitiator of the doped monomers responds, is used to form a desired pattern of the optical waveguide. Typically, a wavelength region corresponding to ultraviolet rays is employed, and it is possible to produce an optical waveguide having a special shape, for example, a bent optical waveguide.

Organic monomers, which are contained and fixed in a cross-linking bond of oligosiloxane having organic functional groups capable of being polymerized, may be applied to the above optical reaction. Light is partially radiated on a layer, and a molecular structure of a dopant is deformed only in the portion of the layer onto which light is radiated. In the irradiated portion of the layer, the monomers are bonded to oligosiloxane capable of being polymerized, or transition, which corresponds to conversion of the monomers into dimers or polymerization of the monomers, occurs. Thereby, matrices and the doped monomers each have different molecular weights and molecular structures between portions of the layer, on which light is and is not radiated. Accordingly, a concentration gradient of the photoresponsive organic monomer selectively occurs in the portions of the layer, on which light is and is not radiated. Selective radiation of light on the layer leads to migration of the doped photoresponsive organic monomers from the portion of the layer on which light is radiated to the portion of the layer on which light is not radiated. Furthermore, in the portion of the layer on which light is radiated, the monomers are bonded to oligosiloxane, or else transition, which corresponds to conversion of the monomers into dimers or polymerization of the monomers, occurs. In the photosensitive hybrid material, on which light is radiated, mobility and volatility of the doped photoresponsive organic monomers are sufficiently or completely reduced.

Hereinafter, a detailed description will be given of the transition of the molecular structure occurring in the photosensitive hybrid material during the radiation of light.

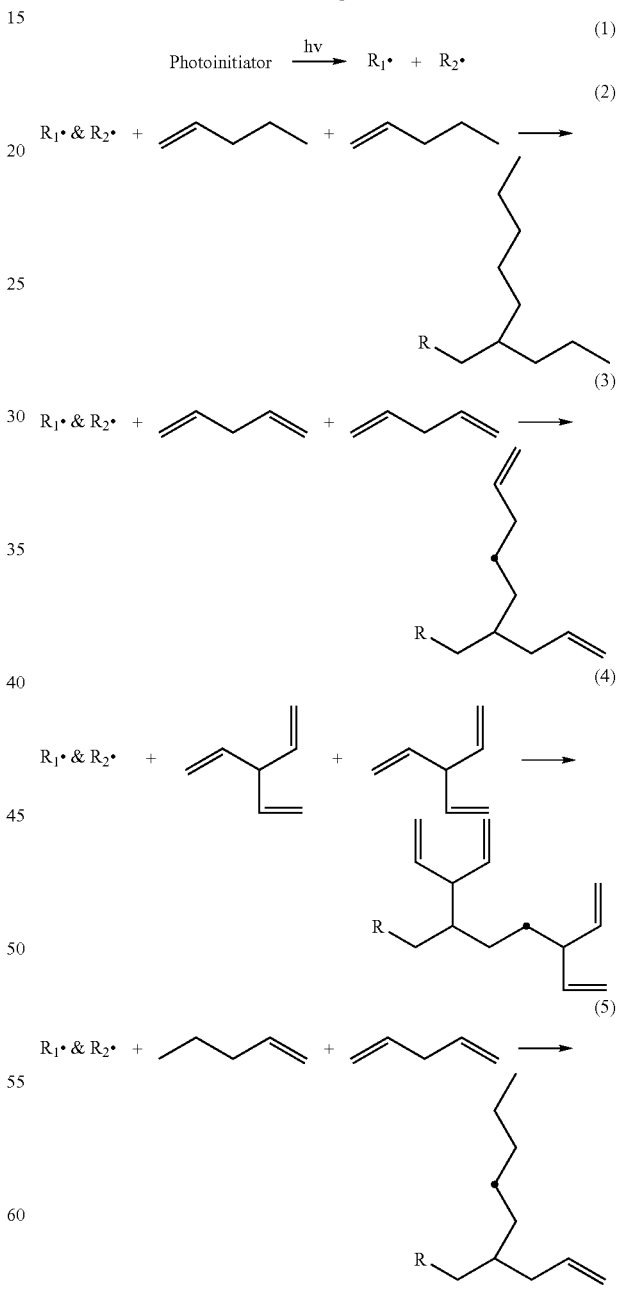

As shown in Reaction equation (1), a photoinitiator in a photosensitive hybrid material forms two radicals when light is radiated thereto. The radicals are bonded to acrylate-based organic monomers which are capable of forming polymers and have organic networks. With respect to this, when the acrylate-based organic monomers have one functional group, two functional groups, three functional groups, or a combination of one functional group and two functional groups, each bond is made as shown in Reaction equations (2), (3), (4), or (5).

The acrylate-based organic monomers, which are capable of being polymerized, form randomly arranged chains in conjunction with portions of chains constituting the photosensitive hybrid material in a matrix through a photopolymerization reaction. Therefore, molecular structures and matrix structures of the doped organic monomers are different from each other between portions of a layer onto which light is and is not radiated, resulting in photomigration of the organic monomers. Additionally, various types of optical reactions, such as the photopolymerization reaction of the monomers with the matrix, occur in the portion of the layer onto which light is radiated. Hence, the refractive index of the portion of the layer onto which light is radiated, is higher than that of the portion of the layer onto which light is not radiated.

The molecular transition as described above may occur as various types. Needless to say, other types of reactions may occur in addition to the molecular transition as described above.

During the radiation of light, the number of monomer molecules, which are fixed and polymerized with oligosiloxane having organic functional groups capable of being polymerized by the radiation of light, increases in accordance with an increase in intensity of an incidence beam. Therefore, the higher intensity of the incidence beam causes a larger change in refractive index of the portion of the layer onto which light is radiated.

As well, the diameter of a section of light formed on the layer and a radiation direction of light on the layer may be adjusted by changing the convergence of light and the angle of the incident beam. Accordingly, it is preferable to use a long wavelength in order to form a wide wire, and the angle of the incident beam or the convergence of the beam may be reduced according to an increase in diameter of the section of light formed on the layer.

The wavelength of the beam must be selected so that it does not affect oligosiloxane capable of being polymerized in the layer but so that it sufficiently initiates a desired molecular transition of the photoinitiator. Accordingly, the selected wavelength depends on materials constituting oligosiloxane which has organic functional groups capable of being polymerized with specific organic monomers used as a starting material in each case. Furthermore, wavelengths, which decompose components constituting the layer or negatively affect the quality of a final device, must be excluded.

A method of producing the optical waveguide through the optical reaction as described above may comprise radiating light of a wavelength having high transmissivity to the layer through a mask having a desired optical waveguide pattern. The method using the mask is well known, and typically applied to produce a semiconductor device using a photoresist. Furthermore, when using a laser, it is possible to conduct direct radiation without using the mask.

With respect to the radiation of light, electrons, ions, and neutrons may be used in addition to a light source. The radiation of particles on some starting materials is useful to assure high spatial resolution.

The next stage relates to the development of the pattern of the optical waveguide, onto which light is radiated, on the layer. The development is achieved merely by heating the layer so as to volatilize the doped organic monomers of the portion of the layer onto which light is not radiated. At this stage, the organic monomers, which participate in an optical reaction of the irradiated portion of the layer, are not removed, leading to the following results. In other words, the thickness of the layer is reduced at the portion of the layer onto which light is not radiated, due to the removal of a dopant onto which light is not radiated. The refractive index of the portion of the layer onto which light is radiated, is increased due to the optical reaction between the matrix and the dopant or in the dopant, but the refractive index of the portion of the layer onto which light is not radiated is relatively reduced, resulting in small deformation between the portions of the layer onto which light is and is not radiated.

The maximum development temperature depends on physical and chemical properties of oligosiloxane which has organic functional groups capable of being polymerized with the photoresponsive organic monomers. With respect to this, considerable matters are undesirable chemical changes caused by migration depending on a glass transition temperature of oligosiloxane, which has organic functional groups capable of being polymerized, the temperature of a dopant which is fixed to oligosiloxane having organic functional groups capable of being polymerized, and heat of the materials.

The development must be conducted at a temperature which insignificantly affects the desirable properties of a final device. Accordingly, the photoresponsive organic monomers must have volatility suitable to conduct the development at a desirable temperature.

Through the above procedure, the optical waveguide 5 is spontaneously formed. After the optical waveguide 5 is formed, an upper clad layer 6 may be or may not be formed. The formation of the upper clad layer insignificantly affects the functions of the optical waveguide device.

FIGS. 1a to 1c (right column) illustrate the production of an embedded-type multimode optical waveguide 4 which includes a core layer having a size of 10 microns or more. In the production, a transparent and photosensitive hybrid material 2, in which photoresponsive monomers are doped into oligosiloxane having organic functional groups capable of being polymerized, is thickly applied on a substrate 1. Subsequently, the multimode optical waveguide is formed in a coat on the substrate through two photon absorption using a laser 3: The formation mechanism of the optical waveguide is the same as that of the optical waveguide as shown in the left column of FIGS. 1a to 1c.

Produced through photomigration caused by a concentration gradient and a chemical potential difference resulting from a molecular structure change due to an optical reaction of the photosensitive hybrid material as shown in FIG. 1c, the optical waveguide is advantageous in that it has a desirable refractive index distribution between different dielectric regions.

Typically, a refractive index change is sluggish and symmetrical with respect to an axis of a light beam while corresponding to a sectional area change of light radiated on the substrate. The concentration of the photoresponsive organic monomer having the high refractive index is the highest at the portion on which light is radiated, and gradually decreases moving away from the beam because of the optical reaction and the photomigration induced thereby. As for a thickness distribution of the layer after the development, the layer is thickest at the portion on which light is radiated, and gradually decreases moving away from the beam due to the photomigration. The thickness of the layer is in proportion to the concentration of organic monomer used in the optical reaction. These features contribute to the almost complete removal of roughness of edges of an optical waveguide produced through the conventional method. The roughness results in a high scattering loss.

According to the present invention, it is confirmed that the multimode optical waveguide produced through the photomigration is stable at room temperature for one month or more and little migration of the dopant occurs.

In the present invention, the dopant having the high refractive index is used to increase the refractive index at a selected region. However, those skilled in the art will easily appreciate from the above teachings that a dopant having a low refractive index is capable of being photomigrated in a matrix having a high refractive index.

If only the thickness distribution is to be obtained through the photomigration, it may be obtained merely by making the refractive indices of the dopant and the matrix the same as each other. This method is very useful to produce an optical device having a regular change in a layer.

The multimode optical waveguide produced according to the above description is very useful to optical communication devices and optical interconnection devices for printed circuit boards.

In the present invention, the multimode optical waveguide is produced through the photomigration with respect to oligosiloxane, which has organic functional groups capable of being polymerized, and the photoresponsive organic monomers. However, it is to be understood that, in addition to the photomigration, the use of various mechanisms, such as densification or condensation, falls within the bounds of the present invention.

Mode for the Invention

A better understanding of the present invention may be obtained through the following examples which are set forth to illustrate, but are not to be construed as the limit of the present invention.

EXAMPLE 1

13.78 g of 3-methacryloxypropyltrimethoxysilane (Aldrich Corp.) and 12.00 g of diphenylsilanediol (Fluka Corp.) were mixed with each other, and 0.1 g of sodium hydroxide was added thereto as a catalyst for promoting a siloxane reaction. Agitation was conducted at 80° C. for 6 hours to produce a methacryl-phenyl-silica hybrid material.

Butanediol diacrylate was added as a photoresponsive organic monomer for polymerization in an amount of 10 mol % based on total alkoxide, and benzil dimethyl ketal (BDK) was added as a photoinitiator organic monomer capable of forming dimers for polymerization in an amount of 3 mol % based on total alkoxide. Agitation was conducted until the organic monomers were completely dissolved, thereby creating a solution.

The solution was applied on a silicone wafer using a spin coater to form a coat, and light was radiated onto the coat using a halogen-xenon light. The resulting layer was dried at 150° C. for 5 hours. A refractive index was measured depending on the amount of radiated ultraviolet rays using a prism coupler, and the results are described in Table 1.

TABLE 1

| Amount of radiated ultraviolet rays | Increase in refractive index (%) |
|---|---|
| 0 J | 0.00 |
| 20 J | 0.65 |

TABLE 1-continued

| Amount of radiated ultraviolet rays | Increase in refractive index (%) |
|---|---|
| 150 J | 0.95 |
| 250 J | 1.24 |
| 400 J | 1.54 |

EXAMPLE 2

The procedure of example 1 was repeated except that butanediol diacrylate was added as an organic monomer in the amount based on total alkoxide as described in the following Table 2, and the results of example 2 are described in the following Table 2.

TABLE 2

| Butanediol diacrylate amount (%) | Increase in refractive index (%) |
|---|---|
| 0 | 0.15 |
| 10 | 1.7 |
| 20 | 2.5 |
| 30 | 3.25 |
| 40 | 3.95 |
| 50 | 4.7 |

EXAMPLE 3

The procedure of example 1 was repeated except that the amount of the BDK monomer, which was added to the methacryl-phenyl-silica hybrid material according to example 1, was set to 10 mol % based on total alkoxide, and that methyl methacrylate, butanediol diacrylate, and trimethylopropane triacrylate, which were classified in accordance with the number of functional groups of an acrylate-based organic monomer, were added in amounts of 10 mol % based on total alkoxide. The results of example 3 are described in the following Table 3.

TABLE 3

| Acrylate-based monomer (No. of functional groups) | Amount (%) | BDK amount (%) | Increase in refractive index (%) |
|---|---|---|---|
| Methyl methacrylate(1) | 10 | 10 | 1.65 |
| Butanediol diacrylate(2) | 10 | 10 | 2.45 |
| Trimethylopropane triacrylate(3) | 10 | 10 | 3.4 |

EXAMPLE 4

The procedure of example 1 was repeated except that the amount of the BDK monomer, which was added to the methacryl-phenyl-silica hybrid material according to example 1, was set to 10 mol % based on total alkoxide, and that trimethylopropane triacrylate, which had three functional groups, of acrylate-based organic monomers, was added in the amount based on total alkoxide as described in Table 4. The results of example 4 are described in the following Table 4.

TABLE 4

| Trimethylopropane triacrylate amount (%) | BDK amount (%) | Increase in refractive index (%) |
|---|---|---|
| 0 | 10 | 1.52 |
| 10 | 10 | 3.4 |
| 20 | 10 | 3.87 |
| 30 | 10 | 4.21 |
| 40 | 10 | 4.63 |

EXAMPLE 5

The procedure of example 1 was repeated except that a solution, which contained 10 mol % butanediol diacrylate and 3 mol % BDK based on total alkoxide, was applied on a wafer using a spin coater, light was radiated onto a mask, and heat treatment was conducted at 150° C. for 5 hours.

FIG. 2 is a light microscope picture of a section of a multimode optical waveguide produced through the above procedure, which shows that the optical waveguide has a large core layer. The optical waveguide showed an optical transmission loss of 0.25 dB/cm at a wavelength of 850 nm.

FIG. 3 is a near field image of a 1×4 splitter produced through the above procedure, which shows that light is desirably distributed at a wavelength of 1550 nm.

EXAMPLE 6

The procedure of example 1 was repeated except that a solution, which contained 10 mol % butanediol diacrylate and 3 mol % BDK based on total alkoxide, was applied on a wafer using a spin coater, light was directly radiated using a He-Cd laser having a wavelength of 325 nm without a mask, and heat treatment was conducted at 150° C. for 5 hours.

FIG. 4 is a light microscope picture of a section of a multimode optical waveguide produced through the above procedure, which shows that the optical waveguide has a large core layer. The optical waveguide showed an optical transmission loss of 0.15 dB/cm at a wavelength of 850 nm.

FIG. 5 illustrates an output pattern of light of a white light of the optical waveguide produced through the above procedure, which shows that light is desirably guided.

FIG. 6 is a near field image of the optical waveguide produced through the above procedure, which shows that light is desirably guided at a wavelength of 850 nm.

INDUSTRIAL APPLICABILITY

As described above, the present invention is advantageous in that, since a process of forming a separate clad layer and a process of etching an optical waveguide are unnecessary, a production process is simplified, and in that it is possible to produce a multimode optical waveguide which has low light loss and includes a structure having a size of 10 microns or more.

The invention claimed is:

1. A method of producing a planar multimode optical waveguide by direct photo-patterning, comprising:
applying a photosensitive organic-inorganic hybrid material layer for the multimode optical waveguide onto a substrate in a thickness of 10 microns or more, the organic-inorganic hybrid material comprising oligosiloxane having one or more organic functional groups capable of being polymerized selected from the group consisting of an acryl functional group, a methacryl functional group, an allyl functional group, a vinyl functional group, and an epoxy functional group, and at least one of an organic monomer which is capable of forming a polymer and a photoinitiator which forms dimmers upon light radiation to initiate polymerization;
patterning the applied photosensitive organic-inorganic hybrid material; and
radiating light having a predetermined wavelength range onto the patterned photosensitive organic-inorganic hybrid material layer to form the multimode optical waveguide having a structure that is 10 microns or more long and 10 microns or more wide by refractive index modulation between regions onto which light is and is not radiated.

2. The method of claim 1, wherein a refractive index of the photosensitive organic-inorganic hybrid material is permanently changed by light radiation.

3. The method of claim 1, wherein the oligosiloxane is of Formula 1-1 or Formula 1-2

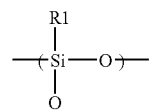

Formula 1-1

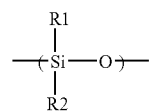

Formula 1-2 wherein R1 and R2 are each independently a straight-chain, branched-chain, or ring C1-12 hydrocarbon compound having at least one of an acryl functional group, a methacryl functional group, an allyl functional group, a vinyl functional group, and an epoxy functional group.

4. The method of claim 1, wherein the organic monomer comprises at least one member selected from the group consisting of a photoresponsive acrylate-based monomer, a photoresponsive cinnamic acid-based monomer, a photoresponsive ester-based monomer, a dicarboxylic acid cinnamyl monomer, and a methacrylic acid cinnamyl monomer.

5. The method of claim 4, wherein the photoresponsive acrylate-based monomer is selected from the group consisting of butyl acrylate, ethylhexyl acrylate, cyclohexyl acrylate, butanediol diacrylate, tripropylene glycol diacrylate, trimethylopropane trimethacrylate, pentaerythritol tetraacrylate, and ditrimethylopropane tetraacrylate.

6. The method of claim 4, wherein the photoresponsive cinnamic acid-based monomer is selected from the group consisting of methyl cinnamate, ethyl cinnamate, vinyl cinnamate, aryl cinnamate, cinnamyl cinnamate, glycol cinnamate, and benzyl cinnamate.

7. The method of claim 1, wherein the photoinitiator is at least one member selected from the group consisting of benzoin ether monomer, a benzylketal monomer, a dialkoxy actophenone monomer, a hydroxyl alkylphenone monomer, an an aminoalkyphenone monomer.

8. The method of claim 1, wherein patterning comprises placing a mask having a desired pattern onto the photosensitive organic-inorganic hybrid material layer to produce a masked photosensitive organic-inorganic hybrid material layer.

9. The method of claim 8, wherein radiating comprises radiating the masked photosensitive organic-inorganic hybrid material layer.

10. The method of claim 1, wherein radiating comprises directly radiating the photosensitive organic-inorganic hybrid material layer with a laser, wherein the photosensitive organic-inorganic hybrid material layer is not masked.

11. The method of claim 1, wherein radiating comprises directly radiating the interior of the photosensitive organic-inorganic hybrid material layer in an embedded manner with a laser.

* * * * *